(12) United States Patent
Borders et al.

(10) Patent No.: US 9,275,479 B2
(45) Date of Patent: Mar. 1, 2016

(54) METHOD, SYSTEM AND COMPUTER PROGRAM PRODUCT FOR CREATING COLLAGES THAT VISUALLY RESEMBLE A PARTICULAR SHAPE OR GROUP OF SHAPES

(71) Applicant: COLLAGE.COM, LLC, White Lake, MI (US)

(72) Inventors: Kevin R. Borders, Silver Spring, MD (US); Joseph M. Golden, Ann Arbor, MI (US)

(73) Assignee: COLLAGE.COM, LLC, White Lake, MI (US)

( * ) Notice: Subject to any disclaimer, the term of this patent is extended or adjusted under 35 U.S.C. 154(b) by 74 days.

(21) Appl. No.: 13/768,016

(22) Filed: Feb. 15, 2013

(65) Prior Publication Data
US 2013/0155069 A1    Jun. 20, 2013

Related U.S. Application Data

(63) Continuation-in-part of application No. 12/909,452, filed on Oct. 21, 2010, now Pat. No. 8,976,198.

(60) Provisional application No. 61/279,510, filed on Oct. 22, 2009.

(51) Int. Cl.
*G09G 5/00* (2006.01)
*G06F 17/00* (2006.01)
(Continued)

(52) U.S. Cl.
CPC ................ *G06T 11/20* (2013.01); *G06F 3/018* (2013.01); *G06F 3/0481* (2013.01);
(Continued)

(58) Field of Classification Search
CPC ....... G09G 5/14; G06F 17/212; G06F 17/211; G06F 3/0481; G06F 9/4443; G06F 17/30867; G06F 17/30961; G06T 3/4038
USPC .......... 345/629–641; 715/243–253, 764, 765, 715/769, 788, 799, 800; 382/284; 707/791–797, 802, 803, 805
See application file for complete search history.

(56) References Cited

U.S. PATENT DOCUMENTS 7,478,323 B2    1/2009  Dowdy
7,529,429 B2    5/2009  Rother et al.
(Continued)

OTHER PUBLICATIONS

Jun Xiao, et al.; "Mixed-Initiative Photo Collage Authoring"; published in ACM MM 2008, Vancouver, BC, Canada, Oct. 27-31, 2008; http://www.hpl.hp.com/techreports/2008/HPL-2008-199.pdf.
(Continued)

*Primary Examiner* — Phi Hoang
*Assistant Examiner* — Andrew Shin
(74) *Attorney, Agent, or Firm* — Brooks Kushman P.C.

(57) ABSTRACT

A method, system and computer program product for creating collages that visually resemble a particular shape or group of shapes are provided. The method is a computer-implemented method of creating a shape collage and includes receiving a shape specification signal which specifies at least one desired shape. Each desired shape has at least one shape boundary and an area. The method also includes receiving image data which represents a plurality of images and processing the signal and the data to obtain a shape collage of the images which at least partially covers and conforms to the area of the at least one desired shape. The step of processing includes the steps of evaluating whether each image is to be treated as being either within or without the area and removing or hiding any image that is evaluated as being outside the area.

19 Claims, 9 Drawing Sheets

(51) Int. Cl.

| | | |
|---|---|---|
| *G06F 3/048* | (2013.01) | |
| *G06K 9/36* | (2006.01) | |
| *G06F 7/00* | (2006.01) | |
| *G06T 11/20* | (2006.01) | |
| *G06F 17/21* | (2006.01) | |
| *G06F 17/30* | (2006.01) | |
| *G06F 9/44* | (2006.01) | |
| *G06F 3/0481* | (2013.01) | |
| *G06F 3/01* | (2006.01) | |
| *G09G 5/14* | (2006.01) | |
| *G06T 11/60* | (2006.01) | |

(52) U.S. Cl.
CPC ........... *G06F 9/4443* (2013.01); *G06F 17/212* (2013.01); *G06F 17/30867* (2013.01); *G06F 17/30961* (2013.01); *G06T 11/60* (2013.01); *G09G 5/14* (2013.01)

(56) References Cited

U.S. PATENT DOCUMENTS

| | | | |
|---|---|---|---|
| 7,532,771 B2 | 5/2009 | Taylor et al. | |
| 7,576,755 B2 | 8/2009 | Sun et al. | |
| 7,620,267 B2 | 11/2009 | Widdowson | |
| 7,644,364 B2 | 1/2010 | Patten et al. | |
| 7,848,596 B2 | 12/2010 | Widdowson | |
| 8,078,969 B2 | 12/2011 | Harrison | |
| 8,126,192 B2 | 2/2012 | Sagoo et al. | |
| 8,280,164 B2 | 10/2012 | Luo et al. | |
| 2004/0160462 A1 | 8/2004 | Sheasby et al. | |
| 2005/0044485 A1 | 2/2005 | Mondry et al. | |
| 2005/0071783 A1* | 3/2005 | Atkins | 715/851 |
| 2005/0193613 A1 | 9/2005 | Faltesek | |
| 2006/0181736 A1 | 8/2006 | Quek et al. | |
| 2007/0098266 A1 | 5/2007 | Chiu et al. | |
| 2007/0283284 A1* | 12/2007 | Schorr | G06F 17/21 715/764 |
| 2008/0075390 A1 | 3/2008 | Murai et al. | |
| 2008/0123993 A1 | 5/2008 | Widdowson | |
| 2008/0215985 A1 | 9/2008 | Batchelder et al. | |
| 2009/0003712 A1 | 1/2009 | Mei et al. | |
| 2009/0148064 A1 | 6/2009 | Schulz | |
| 2010/0005417 A1 | 1/2010 | Lanahan et al. | |
| 2010/0164986 A1 | 7/2010 | Wei et al. | |
| 2010/0199227 A1 | 8/2010 | Xiao et al. | |
| 2010/0259544 A1 | 10/2010 | Chen et al. | |
| 2010/0275152 A1 | 10/2010 | Atkins et al. | |
| 2010/0322521 A1 | 12/2010 | Tal et al. | |

OTHER PUBLICATIONS

Hui Chao, et al.; "Structured Layout for Resizable Background Art"; published in ACM MM 2009; http://www.hpl.hp.com/techreports/2009/HPL-2009-249.pdf.

Office Action; corresponding U.S. Appl. No. 12/909,452; mailed May 9, 2014.

Notice of Allowance; corresponding U.S. Appl. No. 12/909,452; date of mailing Jan. 13, 2015.

\* cited by examiner

METHOD, SYSTEM AND COMPUTER PROGRAM PRODUCT FOR CREATING COLLAGES THAT VISUALLY RESEMBLE A PARTICULAR SHAPE OR GROUP OF SHAPES

CROSS-REFERENCE TO RELATED APPLICATIONS

This application is a continuation-in-part of U.S. patent application Ser. No. 12/909,452 filed Oct. 21, 2010, which claims the benefit of U.S. provisional patent application No. 61/279,510 filed Oct. 22, 2009.

TECHNICAL FIELD

This invention generally relates to method, systems and computer program products for creating shape collages and, in particular, to methods, system and computer program products which create shape collages by automatically determining placement of images in the shape collages.

Overview

Shape collages may be visually appealing, whether viewed in digital form on a display, printed on paper, knit into fabric, or displayed on other objects. One of ordinary skill in the field knows that shaped collage images can be printed on or transferred onto almost any type of object. Regardless of the eventual embodiment of a shape collage, the process of creating one can be complicated and time-consuming. Creating a shape collage by hand requires one to be skilled in the field of image editing, and expend a decent amount of manual effort.

It is therefore desirable to partially or fully automate the process of creating a shape collage with a computer program. Furthermore, it is desirable to allow users of the software to make changes to automatically generated shape collages to customize their display, either by enlarging, shrinking, moving, deleting, rotating/replacing or re-centering individual images without substantially disrupting the look of the collage.

During the process of building a collage of images in a particular shape, it is often desirable to limit the extent to which each image extends beyond the boundary of the shape edge so that the collage more closely resembles the shape. If a shape mask is applied to the collage that cuts off or otherwise occludes images that extend beyond the shape edge, then this reinforces the desire to avoid having images extend beyond the shape edge, as parts extending may be partially or fully hidden from view. Similarly, it is desirable to have images covering the entire area of the shape so that the collage resembles the shape. This desire and the desire to avoid extending beyond the shape edge are often in conflict. For shapes other than rectangles and rectangular images, it is currently impossible to fully satisfy both goals.

Many have also recognized the value of automatically arranging images in a collage, and have made computer programs that create collages automatically on the user's behalf. For example, Snapfish.com provides collage creation software on its website that allows users to build rectangular collages. The program used by Snapfish.com will take a plurality of rectangular images, along with their sizes, and arrange them to fit inside of a rectangular area. The Snapfish.com program resizes the rectangular images and arranges them in such a way that the border between images is the same size throughout the entire collage. The resulting collage is precisely rectangular in shape. The Snapfish.com program, however, does not support creating collages in non-rectangular shapes, nor does it remove and re-insert images into a visible area of the collage since by definition the entire rectangular collage area is visible. Furthermore, the Snapfish.com program does not allow the user to move, enlarge, shrink, or delete specific images from a generated layout.

Shapecollage.com provides a computer program for automatically constructing shape collages. The Shapecollage.com program employs an algorithm for iteratively adjusting image placement so that images will fit into any arbitrary shape. The algorithm tries to minimize overlap between images and minimize the amount of uncovered space inside of the collage shape.

The Shapecollage.com program is somewhat undesirable because it cannot arrange images so that no images overlap and the images have even borders between them, like the Snapfish.com program. The Shapecollage.com program will start by placing images randomly in a working area, and then move all of the images inside of the desired shape. Then, it will iteratively pass over each image and adjust its placement based on nearby images. If an image can be moved to produce a more desirable covering of the shape (less overlap with other images and less empty space), then it will be moved accordingly at each step. After this algorithm is applied for several iterations, images will settle in their final places, and the Shapecollage.com program will produce a final collage image. The approach of iteratively adjusting image placements solely using a metric based on nearby images precludes creation of a more desirable collage that has even borders between all images and in which no images overlap.

The Shapecollage.com program also does not apply a mask to the shape that crops images extending beyond the shape boundary. This prevents the collage from being as visually appealing because the edge is jagged. This problem is particularly pronounced for collages with low numbers of images (for example, it is hard to make four rectangles look like a heart, regardless of how you position them). As such, it only requires that the center of each image lie within the boundary of the shape. It enforces this requirement by not allowing the center of images to move beyond the shape boundary during the iterative adjustment steps.

The Shapecollage.com software allows gaps and overlapping. This means that moving one image has no immediate effect on other images, and it is trivially easy to not move images outside of the shape area during the iterative adjustment stages because whether an image is inside is simply determined by its center point, which can be easily checked against the shape area.

Zumyn.com provides a computer program for creating image mosaics. The image mosaics created by the Zumyn.com software differ from shape collages. The mosaics are rectangular and are filled with images that are all the same size (those that are a different aspect ratio must be cropped) and have no border. Instead of arranging the images so that their locations conform to a shape, the Zumyn.com software arranges the images so that their colors match the color of a background image. Zumyn.com and related mosaic technology focus on color matching of images that are packed into a fixed layout (a grid of images all having the same aspect ratio).

There are numerous other software applications (e.g., Google's Picasa software) that allow for placement of images in a collage, including enlarging, shrinking, and deleting images.

The following U.S. patent documents are related to the present invention: U.S. Pat. Nos. 7,478,323; 7,529,429; 7,532,771; 7,576,755; 7,620,267; 7,644,364; 7,848,596; 8,078,969; 8,126,192; 8,280,164; 2005/0193613; 2006/

0181736; 2008/0075390; 2009/0003712; 2009/0148064; 2010/0164986; 2010/0259544; 2010/0005417; 2010/0275152; 2010/0322521; and 2010/0199227.

The following two reports are also related to the present invention: "Mixed-Initiative Photo Collage Authoring", http://www.hpl.hp.com/techreports/2008/HPL-2008-199.pdf; and "Structured Layout for Resizable Background Art", http://www.hpl.hp.com/techreports/2009/HPL-2009-249.pdf.

SUMMARY OF EXAMPLE EMBODIMENTS

An object of at least one embodiment of the present invention is to provide a method, system and computer program product for creating shape collages wherein images in the collage are automatically assigned to balance the goals of avoiding image cropping (due to over-extension), and avoiding empty spaces inside of the shape boundary (which may be covered by duplicating images, something that is undesirable if the duplicate images are largely visible to a user).

Another object of at least one embodiment of the present invention is to provide a method, computer and computer program product for creating shape collages wherein a more highly constrained approach for building the collage is taken because it maintains even borders between images and prevents overlapping. These constraints mean that when an adjustment is made to one image or area of the collage, one or more other areas of the collage are automatically adjusted or re-arranged to satisfy the constraints of no overlapping and no gaps.

Still another object of at least one embodiment of the invention is to provide a method, system and computer program product for creating more visually appealing shape collages in non-rectangular shapes because they are capable of computing a coverage predicate for images in a collage, and then removing placement action(s) images that lie partially or entirely outside of a shape area. It also gives users the ability to customize collages after by swapping, enlarging, shrinking, deleting, rotating/replacing or re-centering particular images. The transformed or finished collage layout is in response to user placement action(s) that maintains even spacing between images and prevents overlapping.

Yet still another object of at least one embodiment of the invention is to provide method, system and computer program product for creating shape collages by more precisely evaluating whether each image lies inside or outside of the shape area using a coverage predicate, and then removing and reinserting each image that is evaluated outside of the collage based on the coverage predicate.

In carrying out the above objects and other objects of the present invention, a computer-implemented method of creating a shape collage is provided. The method includes receiving a shape specification signal which specifies at least one desired shape. Each desired shape has at least one shape boundary and an area. The method also includes receiving image data which represents a plurality of images and processing the signal and the data to obtain a shape collage of the images which at least partially covers and conforms to the area of the at least one desired shape so that the collage resembles the at least one desired shape and so that the images do not substantially extend beyond the at least one shape boundary. The step of processing includes the steps of evaluating whether each image is to be treated as being either within or without the area and removing or hiding any image that is evaluated as being outside the area.

The step of evaluating may be based on at least one coverage predicate.

The method may further include calculating the at least one coverage predicate and comparing each calculated coverage predicate with a threshold.

The method may further include inserting at least one removed or hidden image back into a portion of the area evaluated as being within the area.

The at least one desired shape may be non-rectangular.

The images in the shape collage may be non-overlapping. Borders between adjacent images in the shape collage may be substantially the same.

The area of the at least one desired shape may be fully covered with the images.

The step of processing may include the step of cropping any images that are positioned outside the at least one desired shape to achieve a more visually defined outline of the at least one desired shape.

The images may be photographic images.

The shape specification signal may specify a plurality of desired shapes.

The method may further include receiving a command signal to locate a user-specified image essentially or proximately at a desired location in the collage and processing the command signal and the shape collage to create a finished shape collage having the user-specified image essentially or proximately at the desired location to increase visual appeal of the finished shape collage to the user.

The method may further include receiving a command signal to resize a user-specified image from an initial size in the collage to a desired size and processing the command signal and the collage to create a finished shape collage having the user-specified image with the desired size to increase visual appeal of the finished shape collage to the user.

Further in carrying out the above objects and other objects of at least one embodiment of the present invention, a system for creating a shape collage is provided. The system includes means for receiving a shape specification signal which specifies at least one desired shape. Each desired shape has at least one shape boundary and an area. The system also includes means for receiving image data which represents a plurality of images and a processor for processing the signal and the image data to obtain a shape collage of the images which at least partially covers and conforms to the area of the at least one desired shape so that the collage resembles the at least one desired shape, and so that the images do not substantially extend beyond the at least one shape boundary. The processor evaluates whether each image is to be treated as within or without the area and either removes or hides any image that is evaluated to be outside the area.

The evaluation may be based on at least one coverage predicate.

The processor may calculate the at least one coverage predicate and compare each calculated coverage predicate with a threshold.

The processor may insert at least one removed or hidden image into a portion of the area evaluated as being within the area.

The system may further include means for receiving a command signal to locate a user-specified image to essentially or proximately at a desired location in the shape collage. The processor processes the command signal and the shape collage to create a finished shape collage having the user-specified image essentially or proximately at the desired location to increase visual appeal of the finished shape collage to the user.

The system may further include means for receiving a command signal to resize a user-specified image from an initial size in the collage to a desired size. The processor processes the command signal and the shape collage to create a finished shaped collage having the user-specified image with the desired size to increase visual appeal of the finished shape collage to the user.

Still further in carrying out the above objects and other objects of the present invention, a computer-readable, non-transitory storage medium is provided. The medium stores a set of instructions including instructions which, when executed by one or more processors, cause the one or more processors to perform steps including receiving a shape specification signal which specifies at least one desired shape. Each desired shape has at least one shape boundary and an area. The steps also include receiving image data which represents a plurality of images and processing the shape specification signal and the image data to obtain a shape collage of the images which at least partially cover and conform to the area of the at least one desired shape so that the collage resembles the at least one desired shape and so that the images do not substantially extend beyond the at least one shape boundary. The step of processing includes the steps of evaluating whether each image is to be treated as within or without the area and removing or hiding any image that is evaluated to be outside the area.

The step of evaluating may be based on at least one coverage predicate.

The steps may further include calculating the at least one coverage predicate and comparing each calculated coverage predicate with a threshold.

The steps may further include inserting at least one removed or hidden image back into a portion of the area evaluated as being within the area.

The steps may further include receiving a command signal to locate a user-specified image essentially or proximately at a desired location in the shape collage and processing the command signal and the shape collage to create a finished shape collage having the user-specified image essentially or proximately at the desired location to increase visual appeal of the finished shape collage to the user.

The steps may further include receiving a command signal to resize a user-specified image from an initial size in the collage to a desired size and processing the command signal and the collage to create a finished shape collage having the user-specified image with the desired size to increase visual appeal of the finished shape collage to the user.

The above objects and other objects, features, and advantages of the present invention are readily apparent from the following detailed description of the best mode for carrying out the invention when taken in connection with the accompanying drawings.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, what is described herein is at least one embodiment of a method, system and computer program for automatically determining placement of images in a collage. The goal of at least one embodiment of the invention is to aid in the creation of a collage that visually resembles a particular shape. Automation provided by the at least one embodiment of the invention described herein makes constructing a shape collage much easier than doing so by hand and produces a more visually appealing collage. The at least one embodiment of the invention additionally improves the visual appeal of the collage by limiting duplication or cropping of images by a shape mask in the final collage.

Figure 1:
FIG. 1 shows a finished rectangular shape collage without a mask.
Figure 2:
FIG. 2 shows a finished shape collage in the shape of a heart with a heart mask.

The example embodiments described herein includes a method, system, and computer program for arranging images in a collage. The program takes a plurality of input images and places them so that they fully or partially cover the area of a shape. The at least one embodiment can arrange images to cover any arbitrary shape outline or group of shape outlines. The at least one embodiment is also capable of placing images so that the borders between each image are all the same, and the area of the shape is fully covered with images. The at least one embodiment of the invention can apply a mask image for the shape to the resulting arranged images to achieve a more visually-defined outline of the shape. The final shape collage produced includes a plurality of images that conform to the shape area. Examples of finished shape collages can be seen in FIG. 1 and FIG. 2 with FIG. 1 being a rectangular shape collage without a mask and FIG. 2 having a mask in the shape of a heart. These shape collages can be produced instantaneously, thus saving manual effort on the part of the user, and it is also more visually appealing than a manually created collage in many cases.

At least one embodiment of the invention further provides a method, system, and computer program for allowing users to move, enlarge, shrink, delete, rotate/replace or re-center images in a collage once it has been created. When these placement actions are taken, the at least one embodiment will automatically adjust the position of other images in the collage to accommodate the change while maintaining even borders between images and full coverage of the shape area. This additional capability provides a substantial benefit to users by allowing them to customize the placement of images in the collage.

At least one embodiment of the invention includes an automatic placement algorithm which iteratively removes images that lie outside of a prescribed shape boundary using a coverage predicate, and then re-inserts those images back into an area of the collage that is inside of the shape boundary according to the coverage predicate. In one embodiment, this coverage predicate is a calculation of the percentage of the area of each image that lies inside of the shape, combined with comparison to a threshold that can specify that the image must be anywhere from fully inside of the shape to avoid removal and re-insertion, to fully outside of the shape before it is removed and re-inserted. The at least one embodiment provides support for user-specified image placement with auto-correction in that the existing collage layout is transformed into a new collage layout that achieves the user's desired action while maintaining an even border between images and full coverage of the shape area.

Building a Shape Collage

Shape Specification

Figure 3:
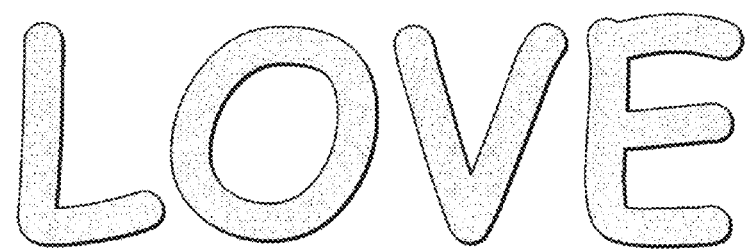
FIG. 3 shows a mask for a collage in the shape of the word "LOVE" along with a vector trace line around each letter defining the location to place the images.

One embodiment of the invention described herein requires a shape specification as an input for creating a shape collage. In the at least one embodiment of the invention, the shape specification defines one or more outlines for the shape in which images are placed. FIG. 3 shows a mask for a collage in the shape of the word "LOVE" along with a vector trace line around each letter defining the location to place the images. Furthermore, the letter 'O' contains a cut-out to exclude the area inside of the letter. This area is treated as if it is outside of the outline. Each outline consists of three or more points that define the outline. For example, a square outline would have four points at the four corners of the square. The outline point list may be in any two-dimensional coordinate system, and the coordinate values may be relative to an origin at any point. One of ordinary skill in the art will appreciate that there are many ways to specify a shape, and that other methods could provide the same shape specification capabilities. The manner in which shapes are specified is not integral to the proper functioning of the invention as long as the shape specification indicates which areas in a two-dimensional space are inside of the shape and which are outside.

Outline Groups

After a shape has been specified as an input to the computer program, a list of at least image aspect ratios, but possibly source image sizes and image identifiers, should also be specified as an input to the computer program. The next step is to group the one or more shape outlines as necessary into outline groups. Separate outlines with non-overlapping bounding boxes may be treated independently, and shape outlines with overlapping bounding boxes may be treated as outline groups. However, it is not necessary to group any outlines into groups; they may be treated independently as well. From this point forward, the method for making a collage in the shape of one outline group is described. This method can be repeated for each outline group in the shape.

Figure 4:
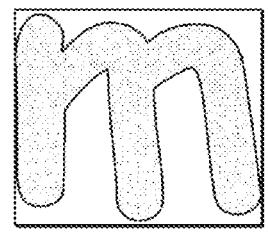
FIG. 4 shows an outline group for the letter "M" with a rectangular bounding box drawn around it.

For a given outline group, the first step is to calculate its rectangular bounding box. FIG. 4 shows an outline group for the letter "M" with a rectangular bounding box drawn around it. This will be the target area for arranging images. Depending on whether it is desired for images to remain fully inside of the shape (not extending beyond its bounding box), for images to fully cover the shape (covering the whole bounding box and extending outside as necessary), or for there to be a balance, the remainder of the method will utilize an image tree that covers a rectangular area either fully enclosing the outline group bounding box, fully inside of the bounding box, or some balanced combination of the two.

An outline group will be covered by an image tree. This tree consists of leaf nodes and branch nodes. Leaf nodes have no children, and a branch node has at least one child node, which may be another branch or a leaf. The leaf nodes represent images in the collage, which must at least include aspect ratios, but may have original image sizes and image IDs as well.

Converting an Image Tree to an Image Arrangement

At least one embodiment of the invention involves the construction of an image tree. This process is described later, but first a process is described by which an image tree is converted into an image arrangement that can be used to actually place the images. Given an image tree, the process of converting the tree structure into an image arrangement includes of the following steps.

A. Compute Aspect Ratios

1. Record or obtain the aspect ratio of each leaf node

2. Iteratively compute the aspect ratio of each branch node from the bottom up.

Each branch node should have either vertical or horizontal specified during the tree building process.

If vertical is specified, then the images or sub-branches in that branch will be lined up vertically one after another having the same width. In this case, the aspect ratios (height/width) are added to compute the aspect ratio of the branch node If horizontal is specified, then the images or sub-branches in that branch will be lined up horizontally one after another having the same height. In this case, the aspect ratios (height/width) will be inverted (1/x), added together, and then the result will be inverted again to compute the aspect ratio of the branch node 3. This process is repeated until an aspect ratio is available for the root of the tree 4. Aspect ratios may be cached at branch nodes, and invalided when a child node changes, to speed up the aspect ratio recalculation process as the image tree is modified.

B. Set Image Tree Position and Size

1. Given the desire to either cover, fit inside of, or a combination of the two with respect to the outline block, the image tree can have the X and Y positions of its origin set, as well as its width and height, to achieve the coverage goal. Since the aspect ratio of the tree is known after completing the previous step, the width can be determined based on the height—or vice-versa—to maintain the correct aspect ratio.

C. Pass Over and Place Images

1. Starting with the first branch node of the root node and proceeding to each successive branch node, each branch should have its images placed at the current position given its computed aspect ratio and the constraining dimension of the branch node to determine the child width or height.

If the branch node uses horizontal child positioning, then the height and Y position of each child will be fixed, and the X position will be advanced from left to right as the algorithm iterates through each child.

If the branch node uses vertical child positioning, then the width and X position of each child will be fixed, and the Y position will be advanced from top to bottom as the algorithm iterates through each child.

2. As each branch is called with the current X, Y position and constraining size (width or height), it should proceed to compute the constraining dimension and starting X, Y position for its own children, and then iterate through those children to repeat the process.

3. When a leaf node is reached, its position can be added to the output arrangement by using the current X, Y position for its offset, fixing either the width or height depending on which dimension is constrained, and then computing the value of the other dimension using the stored image aspect ratio.

Figure 5:
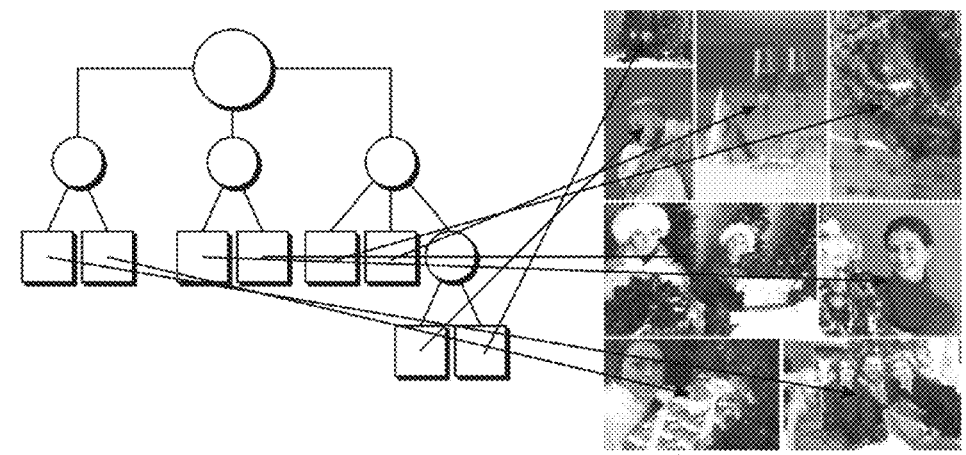
FIG. 5 shows the mapping from a simple image tree to an actual layout.

Whereas the initial image tree may contain as little as the original image aspect ratios and the tree structure, the resulting image arrangement will specify the actual locations and sizes of each image in the collage, which can be used to display the collage to a user. FIG. 5 shows the mapping from a simple image tree to an actual layout.

Building an Image Tree

Given knowledge of how an image tree is translated to an image arrangement, it is now discussed how it is possible to build an image tree. First, there should be a desired target aspect ratio for the image tree based on the aspect ratio of the outline group. One goal during construction of the image tree will be to produce an arrangement that is close to this target aspect ratio. Another goal of image arrangement is for the output images to have similar sizes. If some images are really large and some are really small, then this will lead to a less visually appealing collage.

There are many different strategies for building an image tree given these goals. At least one embodiment of the invention does not depend on any particular strategy for initial tree creation, and one of skill in the field will appreciate that the present invention will work with an initial image tree that was created using any building strategy.

One strategy that may be used to construct an initial image tree is to take the following steps:

1. Iteratively add images to the tree one-by-one
2. For each new image, find a branch node or leaf node where the image will be added.

This branch or leaf node can be selected to meet the similar size and target aspect ratio goals.

Based on an intermediate computation of what the node's size would be in the rendered image, the largest leaf node may be selected for splitting. By splitting the largest images first, images are more likely to conform to the objective of having similar sizes to each other.

A node may be identified based on its size relative to the total image tree size, and/or based on the difference between the current tree aspect ratio and the target aspect ratio. Selecting a node with a particular ratio may result in the insertion bringing the entire tree closer to its target aspect ratio.

Multiple candidate nodes can also be selected and tested, then a final node chosen that best satisfies any combination of the similar size and aspect ratio goals.

3. If the image is added at a leaf node, then the existing leaf node will be replaced with a branch node, and this branch node will have both the original leaf and the new image as child leaf nodes When creating a new branch node from two leaf nodes, there are two options for selecting the node's layout: horizontal and vertical.

Depending on whether horizontal or vertical is selected, the tree will have a different overall aspect ratio, and the images may have different sizes If horizontal is selected, then the aspect ratio (height/width) of the overall tree will decrease. If vertical, then it will increase.

This selection can be made based on an intermediate calculation of the overall aspect ratio for the current image tree at the root node. If the current aspect ratio is less than the target aspect ratio, then vertical may be selected to bring it closer, and if it is higher than the target ratio, then horizontal may be selected to bring it closer to the target ratio.

Refining an Image Tree to Match a Shape

Initially, all image trees are rectangular. In order for the output of an image tree to conform to a shape other than a rectangle, it may be necessary to hide or remove some of the images. This step may include a coverage predicate that computes whether each image in the image tree lies substantially inside of the shape (and should remain in the arrangement), or substantially outside of the shape and should be hidden or removed. If a user has selected images for a collage, then it is undesirable to totally remove the chosen images, as the user wants all of them in the collage. One solution to this is to re-add removed images to a visible area of the shape, leaving behind their original leaf nodes that were substantially outside of the shape and creating new leaf nodes for them in the visible area.

Computing if Images are Inside or Outside Using a Coverage Predicate

Given the specification of the edges of a shape as described earlier, one coverage predicate that computes if images are inside or outside of a shape is to select one or more points in the image (e.g., the center, or the four corners), and then compute whether each point is inside or outside of the shape. If the point(s) are partially or entirely inside of the shape (depending on preference towards avoiding duplicates or avoiding hidden images), then the image is considered inside (i.e. covered by the shape), and if not, it is considered outside (not covered by the shape). Whether a point is inside or outside of a vector can be determined by creating a line that intersects that point, and then counting the number of times the vector crosses over the line starting from the outside of the vector. If the vector crosses over once before the point, then the point is inside of the shape. Twice and it is outside again. Three times, back inside, etc.

Single or multi-point calculations lead to a simplistic method that does not usually yield the best result. For example, if a square image is placed to cover a circle shape having the same center point, then the center will always be inside, and the four corners will always be outside of the shape, regardless of whether the square is made ten times larger than the circle, or if it fits tightly. In one scenario the provided image may be mostly visible, and in the other, it may be mostly cropped. Performing point calculations will not be able to tell one precisely what portion of the image is inside of the target shape area.

Another method for computing the coverage predicate is to iterate over the shape edge specification (if it is a vector or bitmap specification) and see if the edge crosses the edge of a given image. If the shape edge crosses an image edge, then the image and shape edge are overlapping. If the image does not overlap, then one can compute whether it is totally inside or totally outside of the shape by choosing a point inside of the image and computing if that point is inside or outside of the shape as described previously. This is a more accurate coverage predicate, but it only provides three results: inside, outside, or overlapping. Ideally, it would be nice to be able to use a threshold based on images being partially covered.

Figure 6:
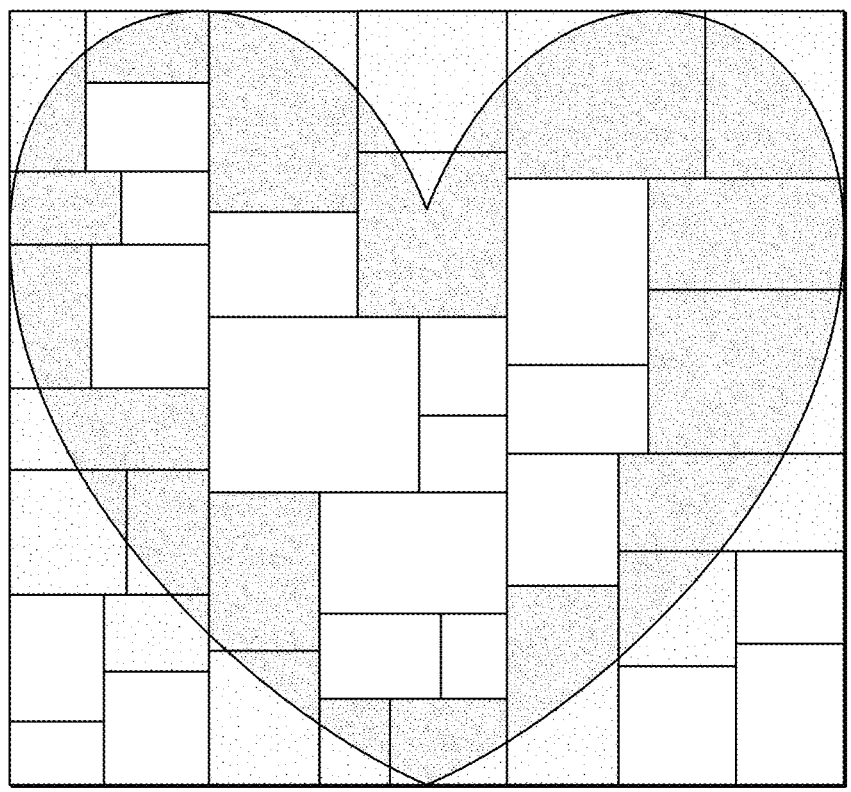
FIG. 6 shows a heart shape path traced over an image tree; the images that are intersected by the shape vector have the portions that are outside of the shape shown in light grey and the portions outside the shape shown in dark grey; the images with a white background are entirely inside or outside of the shape.
Figure 7:
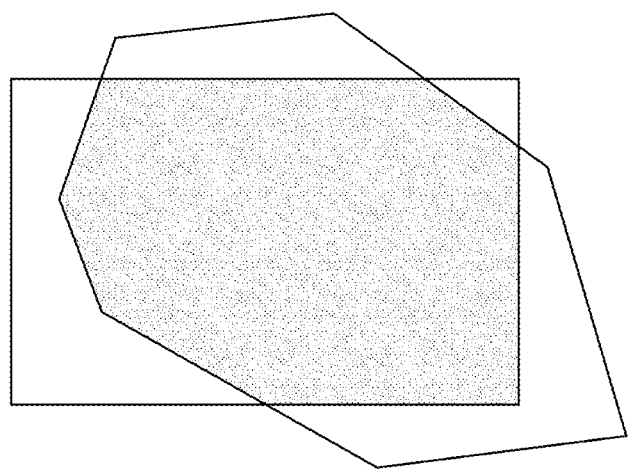
FIG. 7 shows an example of a vector that cuts through a rectangle with the vector in light grey and the rectangle in black; the part of the image inside of the vector shape is highlighted in a dark grey color.

A more precise coverage predicate computation involves tracing the path of the vector through all images in the tree. FIG. 6 shows a heart shape path traced over an image tree. The images that are intersected by the shape vector have the portions that are outside of the shape shown in light grey and the portions outside the shape shown in dark grey. The images with a white background are entirely inside or outside of the shape. The parts of the vector that cross each image can be combined with the bounding box of the image to create a polygon or curved vector that cuts out an area fully within the image. This is the portion of the image that overlaps the visible shape area. Once this area has been computed for all images, images that are fully inside or outside of the shape (and have no vector parts) can be identified as inside or outside using methods discussed previously. Images with vector cut-outs that are covered by the shape can have the area of cut-outs computed using standard formulas for determining the area of polygons, or simple integral sums for curved vector paths. After this coverage area has been determined for each image, it can be divided by the total image area to compute the portion of that image that is inside and the portion that is outside of the shape. An example of a vector that cuts through a rectangle is seen in FIG. 7 with the vector in light grey and the rectangle in black. The part of the image inside of the vector shape is highlighted in a dark grey color. This area can be computed using a polygon area formula and divided by the total rectangle area to compute the coverage percentage.

Yet another method for determining if images should be treated as inside or outside of the shape is to identify key areas of interest within the image, such as faces, using an image processing algorithm. Algorithms for identifying areas of interest are an area of active research that is independent of the present invention. It could benefit from any such algorithm to identify areas of interest and works independently of the algorithm chosen. Once these areas have been identified, then a point or bounding-box algorithm described above can be used to compute whether the area(s) of interest are inside or outside of the shape.

Regardless of which coverage predicate computation method is employed, the remainder of the system described herein functions independently of this predicate. All that the other parts of the method need to know is whether or not an image is considered substantially inside or substantially outside of the shape. It is also possible to employ two separate predicates for each image, one to indicate whether an image is substantially outside of the shape, and another to indicate whether it is substantially inside of the shape. These predicates need not use the same method for computing their result. Policies can then be used to decide under what conditions based on the truth value of these functions images should be removed/hidden and re-added from positions making them not substantially inside of the collage to positions making them substantially inside of the collage.

Pruning and Re-Adding Images

After images have been identified as substantially outside of the shape for hiding or removal, an iteration of pruning may occur, during which images may be re-added to a visible part of the collage. When an image is pruned from the tree, it is important to leave some kind of placeholder leaf node in its place, otherwise the other portions of the image tree will just expand to cover it again. So, one can leave a placeholder with the same aspect ratio as the original image, or change the aspect ratio to any other value. This placeholder may still output the original image or anything else in its place, but if an occluding mask is being applied, then it may not be visible, or may be cropped in the final output.

After a pass of removing images that are not sufficiently covered from the collage and leaving placeholders, one may want to re-add the images to a visible part of the collage. This can be done by performing the same adding step in the original collage creation method, but only inserting the image as a child of or next to another node that is not already marked as a placeholder. By doing this, the image will be placed adjacent to a non-placeholder image, so will have a high chance of being sufficiently covered by the shape.

Because re-adding images can adjust the placement of other images, it may be desirable to repeat coverage predicate calculations and the pruning process multiple times. In many situations, it would be necessary to perform multiple passes of removing and re-adding images before every image originally specified by the user would be sufficiently inside of the shape.

Re-Filling Placeholders

After performing a pass of removing and/or re-adding one or more images, it may happen that some placeholder locations become significantly inside of the shape according to the coverage predicate due to shifting. Because it is desirable to avoid filling large areas of the shape with duplicate images or leaving them empty, visible image leaf nodes may be extracted from the tree, and re-inserted at the tree location of the placeholder. A re-filling pass may be desired after a removal pass to minimize uncovered areas of the shape. In practice, any combination of re-filling and removing operations may take place to adjust the image arrangement until an arrangement is reached that satisfactorily covers a shape without significant overextension of images beyond the shape boundaries or significant uncovered/duplicated portions of the shape.

Putting it all Together

The previous sections have described methods for building an image tree by inserting images, pruning images that are substantially outside of the shape, and re-filling placeholders that are substantially inside of the shape. These three steps may be combined in various ways to arrive at a desirable arrangement. The re-filling step is not necessary to reach a desirable collage arrangement. The pruning step (but not necessarily the re-adding) is highly desired to reach a visually pleasing image arrangement for non-rectangular shapes when there are sufficiently many images in the image tree that at least one would be totally outside of the shape if it were not pruned.

Image Placement

So far how an image tree is built has been described and arrangement for displaying images in a shape collage in a visually appealing manner with even borders and no overlapping, possibly including placeholders for nodes substantially outside of a shape area. After the initial collage creation is complete, the user may still desire to modify the layout to enlarge, shrink, move, delete, rotate/replace or re-center images to produce a customized layout. For example, people often like their favorites images to appear larger and in the center of the collage. One embodiment of the invention supports image placement by implementing the following commands:

Enlarge image
Shrink image
Swap two images
Move image towards desired location
Delete image
Rotate/Replace image
Re-center image These commands may be triggered by any type of user interface action on a collage display user interface. For example, the command to shrink an image may be triggered selecting an image with a button click and then clicking again on a shrink button. It could also be triggered by a pinching gesture on a touchscreen device. Image movement towards a desired location may be triggered by touching/clicking and dragging an image in the user interface. One of ordinary skill in the art can appreciate that the placement commands described herein are not limited to any particular methods of triggering from a user interface or other computer program. One embodiment of the invention will receive each placement command from a command source, such as user interface, and then produce a new image tree representing a layout that partially or completely satisfies the intent of the command.

During the image placement process, there are a number of competing constraints—in addition to enforcement of no image overlapping and even spacing—that may be considered to fulfill the user's expectations of the image placement command as best as possible. It is often difficult or impossible to totally fulfill all of the chosen constraints, so approximate prioritization methods are usually necessary. These general constraints may include the following listed constraints. Additional constraints may also be utilized to evaluate potential layouts during the image placement process, and one of ordinary skill in the art will realize that one embodiment of the present invention can work with any set of layout evaluation constraints:

1. Maintain overall aspect ratio of the entire image tree to match its original target aspect ratio as closely as possible.
2. Minimize movement and resizing of images unrelated to the placement.
3. Keep the target image(s) in the same place
4. Minimize cropping of images by the shape mask.
5. Minimize visibility of duplicate images/placeholders.
6. Do not add or remove images from the collage (except for the delete image command).

Figure 8:
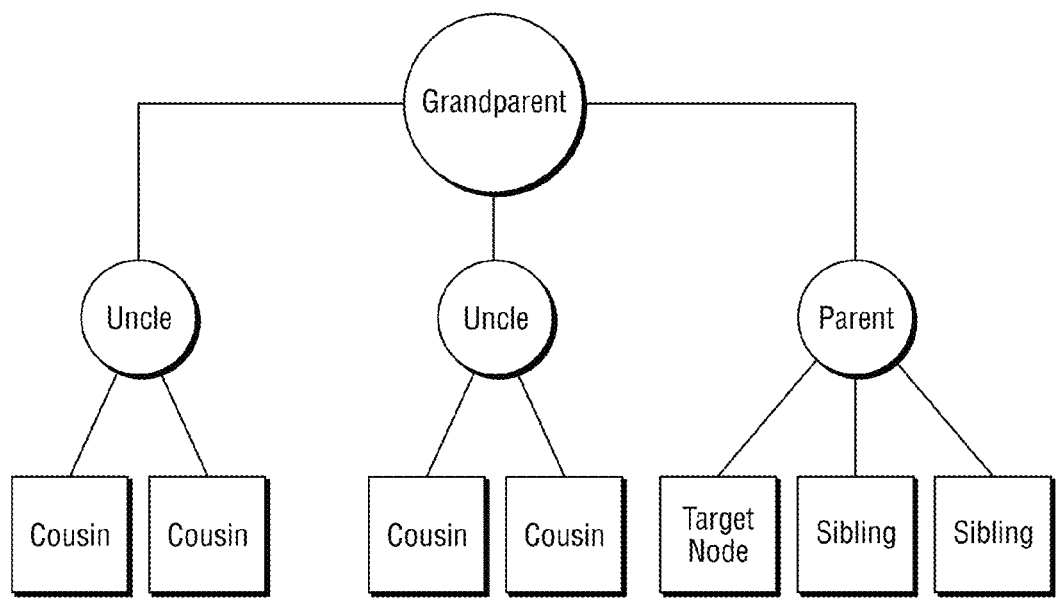
FIG. 8 illustrates the meaning of the names "target node", "sibling", "parent", "grandparent", "uncle", and "cousin" in a tree structure.
Figure 9:
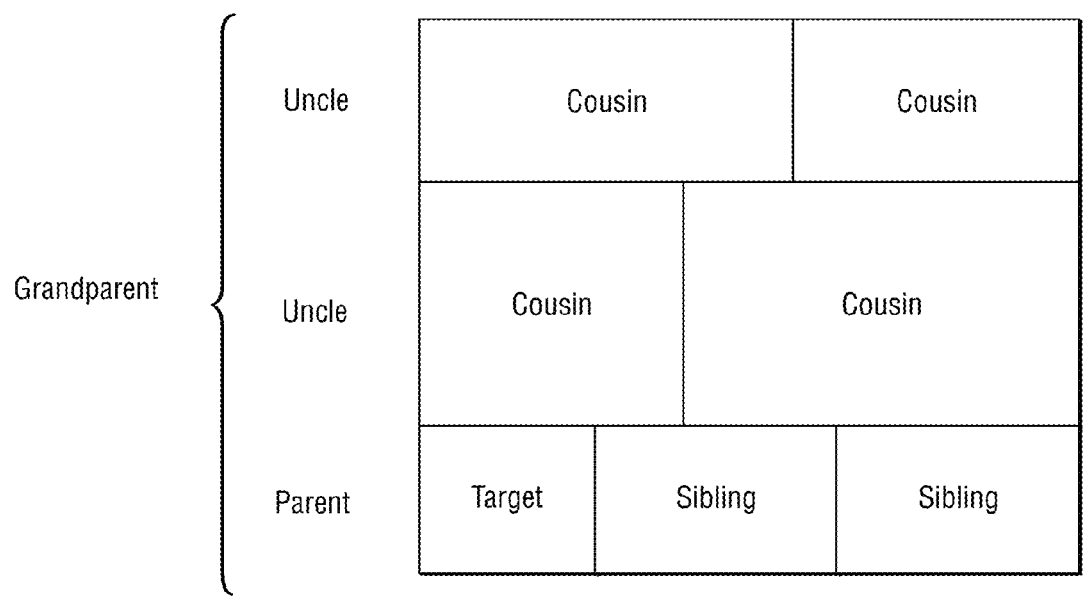
FIG. 9 illustrates the meaning of the names "target node", "sibling", "parent", "grandparent", "uncle", and "cousin" in an image layout.

To accurately describe the placement methods that follow, a few terms are introduced. A target node or nodes are the node or nodes that are being manipulated by the placement action. Only the swap operation has two target nodes. The others have one. The parent node of an image leaf node contains the image leaf node, as well as one or more sibling nodes. These sibling nodes may also be leaf nodes, representing individual images, or branch nodes that contain two or more leaf nodes in their sub-trees. The root node is the node at the top tree, which has no parent node. If there is only one image in a tree, then the image will be in a branch node that is also the root node without a parent. In addition to a parent node, there are uncle nodes (if the parent is not the root), which are siblings of the parent node. Any children of the uncle nodes (if they are not leaf nodes) are called cousin nodes. These may be branch or leaf nodes. The parent of the parent, if present, is the grandparent node. FIG. 8 illustrates these names in the tree structure. FIG. 9 shows how nodes with these names translated into an image layout.

Figure 10:
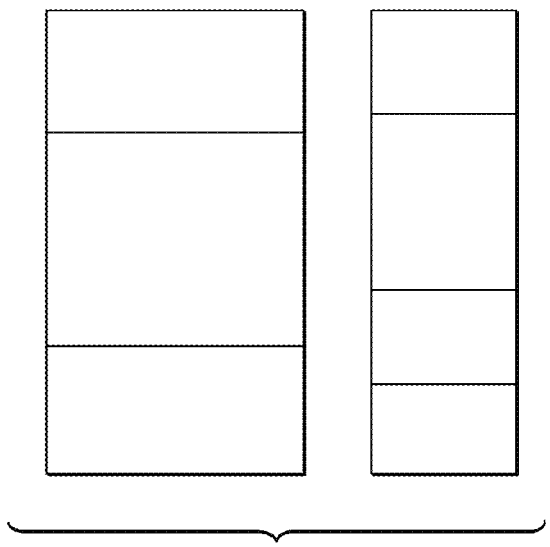
FIG. 10 shows two vertical nodes with the same height that have larger and smaller relative widths, and smaller and larger relative aspect ratios, respectively.

When talking about tree node manipulation, the actual effects of operations on the aspect ratio will depend on whether the node has a horizontal or vertical layout. If a node is horizontal and nodes are appended to it, the nodes will become relatively smaller and the aspect ratio (height/width) will decrease. If a node is vertical and nodes are appended to it, the nodes will still become smaller, but the aspect ratio (height/width) will increase. The relative aspect ratio in the following sections refers to the aspect ratio that a node would have in the vertical orientation, so that an increase in the relative aspect ratio means that child nodes will become relatively smaller, meaning a decrease in actual aspect ratio for horizontal nodes and an increase in actual aspect ratio for vertical nodes. Wider means a decrease in relative aspect ratio that increases the relative width (width for a vertical node, height for a horizontal node). Similarly, narrower means an increase in relative aspect ratio that decreases the relative width. This happens because a vertical node is scaled in size to align with its parent node's height. Increases in its aspect ratio lead to children that are scaled down and make the node narrower. Decreases to its aspect ratio cause the children to be scaled up, leading to a wider node. It is possible to reason about tree operations using relative values because horizontal nodes could be logically turned into vertical nodes by rotating the entire tree 90 degrees before the operation and rotating it 90 degrees in the other direction after the operation. FIG. 10 shows two vertical nodes with the same height that have larger and smaller relative widths, and smaller and larger relative aspect ratios, respectively.

The remainder of this section describes the different placement operations in greater detail.

Image Enlargement

The goal of the image enlargement command is to increase the display size of one particular image. The enlargement command must at least specify the image to enlarge, but may also specify a desired target size and additional parameters such as whether to enlarge the image to a size greater than or less than the desired target size if exactly matching the desired target size is not possible.

There are multiple methods for enlarging an image depending on its position in the current layout and the desired amount of enlargement. The first option is to decrease the parent's relative aspect ratio by decreasing the portion of the parent's aspect ratio occupied by sibling nodes. In so doing, the parent node will increase its relative width and the target node will usually become larger (unless changes to other parts of the collage shrink the grandparent's size by more than the aspect ratio decrease).

The two methods described in the rest of the section—decreasing parent's relative aspect ratio or merging with an uncle—can be selected based a combination of multiple factors. First, if one method fails to produce a desirable result, then the other can be used. Next, it is typically easier to decrease the parent's relative aspect ratio in a desirable way when it is greater than the aspect ratio of an uncle that can be used for moving displaced siblings or swapping siblings with higher relative aspect ratios. So, decreasing parent's relative aspect ratio may be selected based on a threshold determined by only its relative aspect ratio or its aspect ratio relative to that of other uncle nodes. The exact strategy used for selecting which method to employ is not essential to the functioning of the at least one embodiment of the invention, so any strategy can be used and the result will still enlarge the target node, but the different layouts may satisfy the original goals to varying degrees.

Decreasing Parent's Relative Aspect Ratio

There are multiple ways to decrease the parent's relative aspect ratio. These methods generally do not have a direct effect on the structure of the tree above the target node, such as adding/removing uncles. One is to entirely remove sibling nodes from the parent and not replace them in the parent node. This will have a larger effect on the aspect ratio. Depending on the desired amount of enlargement, a sibling node can be selected for removal based on its aspect ratio (removing a sibling with a larger aspect ratio relative to the parent will decrease the parent's relative aspect ratio more, and a smaller node less). Also, multiple sibling nodes can be removed at once to have an even greater reduction on the parent aspect ratio. If the target node has no siblings remaining, then the parent branch node is no longer needed (because it only has one child), and so the target node is moved to be a direct child of the original grandparent node.

Figure 11:
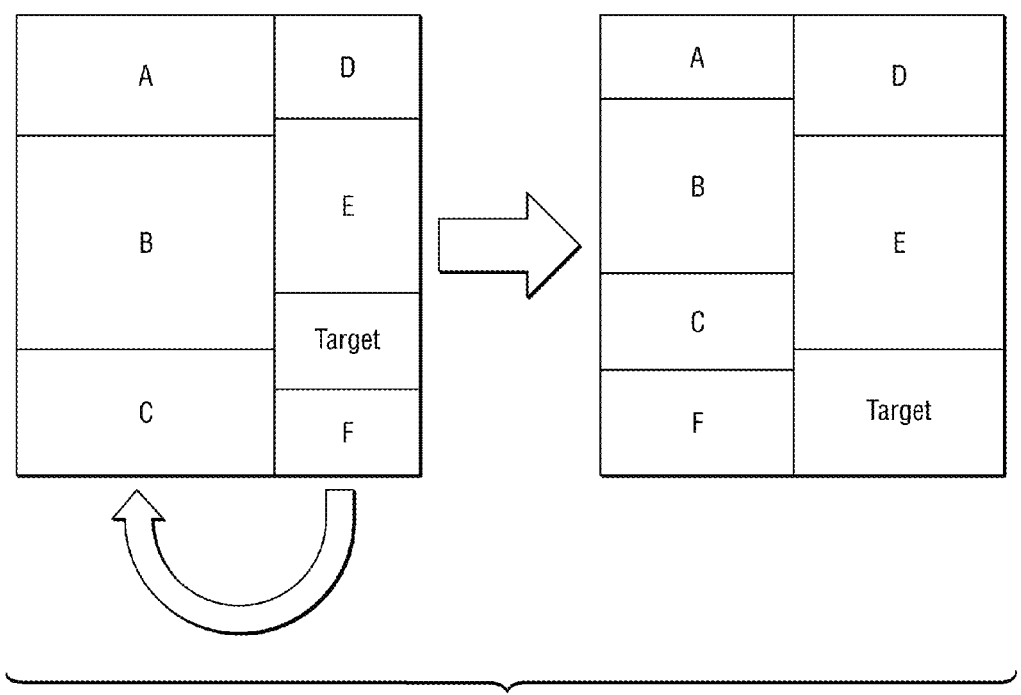
FIG. 11 illustrates removing a sibling from the parent node and re-adding it to an uncle node.

Once removed, image leaf nodes that are descendants of sibling nodes can be re-added anywhere in the collage. Usually a good place to add them is to uncle nodes by either splitting leaf nodes into multiple branch nodes or appending them to existing branch nodes. This reduces the overall impact on the grandparent node's aspect ratio, and thus on the overall tree aspect ratio. It may sometimes be undesirable to redistribute nodes to uncles because doing so may lead to disproportionately small image nodes other than the enlarged image under the grandparent. In this case, a size threshold may be used, beyond which images are redistributed to other locations in the collage not under the grandparent node. This maintains relatively even image sizes. FIG. 11 illustrates this removal and redistribution procedure in the case of removing a sibling node and re-adding it to an uncle.

Figure 12:
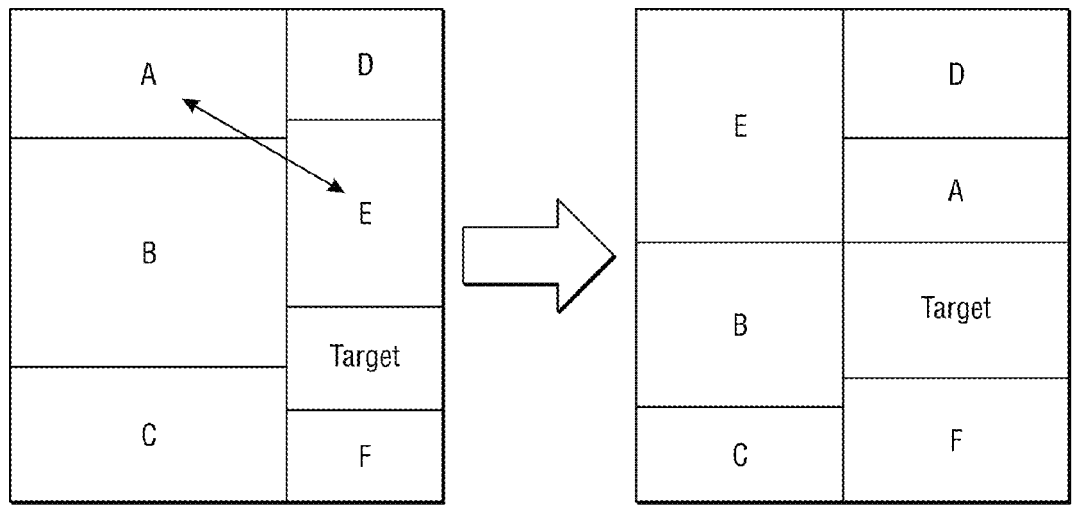
FIG. 12 illustrates swapping a higher-aspect sibling node with a lower-aspect cousin node to increase the size of the target node.

If the desired reduction of the parent's relative aspect ratio is less than the sibling with the smaller aspect ratio relative to the parent, there are multiple options for effecting a smaller parent ratio reduction. One is to swap a sibling node with a node from elsewhere in the tree that has a smaller aspect ratio relative to the parent. This node may be selected from anywhere, but the overall collage is often more balanced when a cousin node is selected for swapping (because its parent, an uncle node, will increase its relative aspect ratio and keep the grandparent's aspect ratio closer to its original value). FIG. 12 illustrates how this swapping procedure effectively enlarges the target image.

Another potential way to decrease the aspect ratio of a sibling is to re-arrange its own children if it is a branch node, or insert a parent branch above it and add a sibling node.

One or more thresholds or decision rules can be used to decide which approach is best for satisfying the desired amount of enlargement. The parent aspect ratio can also be reduced repeatedly using the above methods in a single operation in order to achieve a larger reduction and thus a larger image enlargement. In general, reducing a sibling's aspect ratio relative to the parent will lead to a smaller aspect ratio reduction than removing that node entirely. One possible strategy is to opt for sibling reduction if the target node occupies a larger portion of the parent (and thus any reduction in the parent aspect ratio will have a larger impact on the target node's size), or to opt for one or more sibling removals if the target node occupies a smaller portion of the parent. When reducing a sibling, swapping or modification can be chosen based on availability of suitable nodes for swapping or modification, whether the sibling is already a branch node, or the size of existing leaf nodes under the sibling. These are just a few conditions that can be used for decision-making Regardless of how different options are assessed and chosen, the layout adjustment process described herein to execute the placement remains the same.

Merging with Uncle

Another method for increasing the size of an image is to merge its parent with an adjacent uncle (possibly swapping the desired uncle with another to make it adjacent first) using the following method:

Before moving anything, compute the current relative aspect ratio of the parent node combined with the uncle node (1/(1/Rparent+1/Runcle)) to establish a target aspect ratio for the merged node. This original combine aspect ratio can be used as the target aspect ratio for the merged node directly, or a target aspect ratio can be computed based on a desirable aspect ratio for the merged node based on the overall tree's desired aspect ratio, or a combination of the two (for example, using one vs. the other based on a threshold or combining them using a weighting function).

The target image's aspect ratio may be checked against the target merged node aspect ratio to determine whether there will be extra space above/below, left/right, or there will be no extra space when expanding the target image to occupy the full width or height of the merged node, whichever it hits first without expanding beyond the size of the merged node. This check can indicate whether the new merged node should be assigned a vertical or horizontal layout (if it is assigned the opposite layout of the parent, we would effectively be re-creating a narrower uncle rather than merging with the uncle, but the process is similar).

Create a merged node that takes the place of the parent and the uncle node having the layout determined from step 2.

Add the target image as a child of the merged node (it will be the only child to start)

Repeatedly re-add original sibling and cousin nodes to the merged node while space is available. One way to do this is to create one or more empty sibling branch nodes with target aspect ratios assigned so that when arranged next to the target image node in the new merged node the aspect ratio of the new merged node is close to its target aspect ratio.

These empty branch nodes can then have children added to them repeatedly (from the original sibling and cousin leaf nodes) until they reach their target aspect ratio(s), until the images beneath them reach a desired minimum image size (after which adding more images would make them too small), some combination of the assessment methods, or never.

If it is not possible to create a desirable sibling node layout based on available displaced images, the number of new siblings can be decreased if more than one new sibling has been created, or new siblings can be removed entirely and the displaced images can be added back to the collage at another location outside of the new merged node.

Any remaining former sibling or cousin nodes that do not fit in the merged parent can be re-added elsewhere in collage by splitting leaves and adding them as siblings to the leaf nodes under newly created branch nodes, or by appending them as children to existing branch nodes.

If there is no space in the entire collage or it is determined that the collage layout is undesirable in any way (for example, if images other than the enlarged image are too small), then the algorithm can indicate that the resulting layout is undesirable and cancel the enlargement action. This process may also be executed ahead of time to test if reasonable image enlargement is possible and prevent the original image enlargement.

Figure 13:
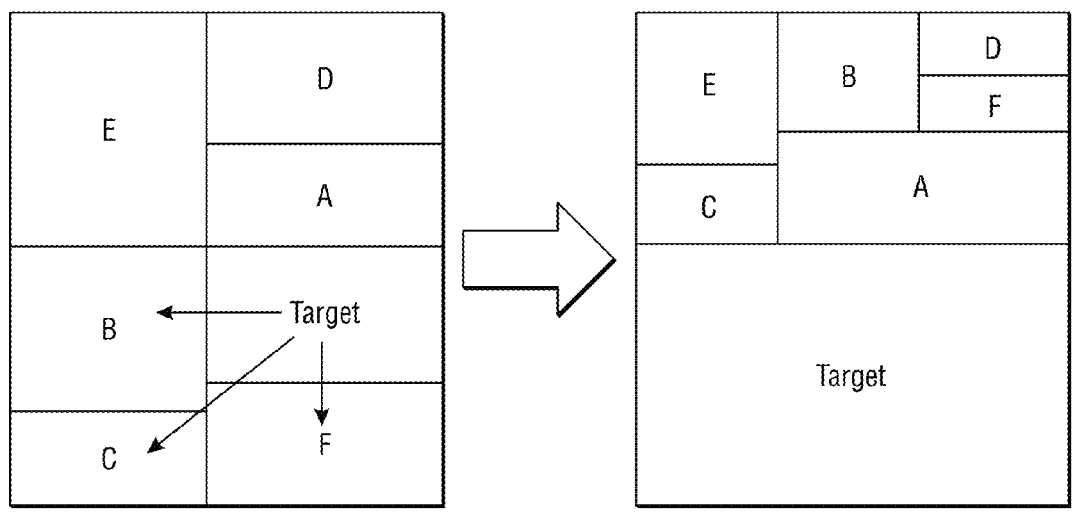
FIG. 13 shows the process of enlarging a target node by merging with an uncle node and redistributing siblings and cousins; letters indicate which images are the same moving from the original to the new layout.

FIG. 13 shows the enlargement process by merging with an uncle node and redistributing siblings and cousins. Letters indicate which images are the same moving from the original to the new layout.

Image Shrinking

There are many ways to reduce the size of an image in a collage layout. One would be to swap it with an image that is already smaller. The problem with this approach is that the target image would move, which a user would not expect. A better approach is to leave the target image as close to its original position as possible (while trying to satisfy other constraints listed at the beginning of this section as well).

Figures 14A, 14B, 14C:
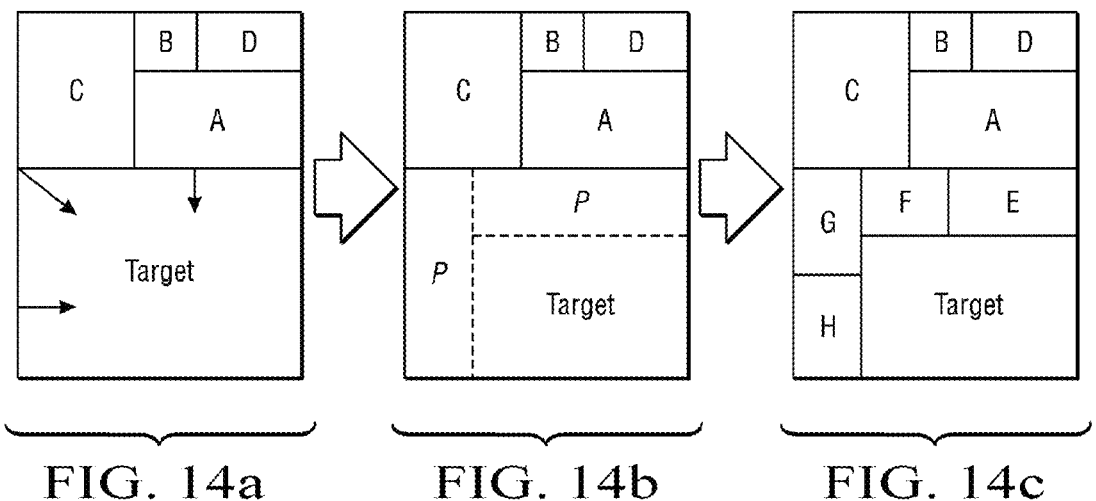
FIGS. 14a-14c show an example of an image being reduced in size, with 14(a) showing the image in its original position, followed by 14(b) with placeholders indicated by the letter p and dotted lines, followed by 14(c) inserting real images into the placeholders (E, F, G, H being taken from other places in the collage (not shown)

The high level approach taken by at least one embodiment of the invention is to add one or more levels of new parent nodes in between the target image and its original parent node. These one or more parent nodes can then have temporary empty branch child nodes added to them (which will be siblings or uncles to the original target image) with target aspect ratios such that the aspect ratio of the original parent will be close to its original value, or close to a target value based on the overall aspect ratio of the layout tree. The target aspect ratios should also be chosen to achieve the desired size reduction for the original image being shrunk. These nodes can then have images added to them that are removed from other places in the collage until the nodes' target aspect ratios are sufficiently close to their targets. FIGS. 14a-14c shows an example of an image being reduced in size, with FIG. 14a showing the image in its original position, followed by FIG. 14b with placeholders indicated by the letter p and dotted lines, followed by inserting real images into the placeholders (E, F, G, H being taken from other places in the collage not shown).

If it is decided that the resulting layout is undesirable because the image being shrunk or other images are too small relative to other images, or if no desirable images are available to fill in the placeholders, then the method can indicate that the result is undesirable and cancel the user action. This may also be tested ahead of time to prevent the user from issuing the image shrinking action in the first place.

Image Swapping

Figure 15:
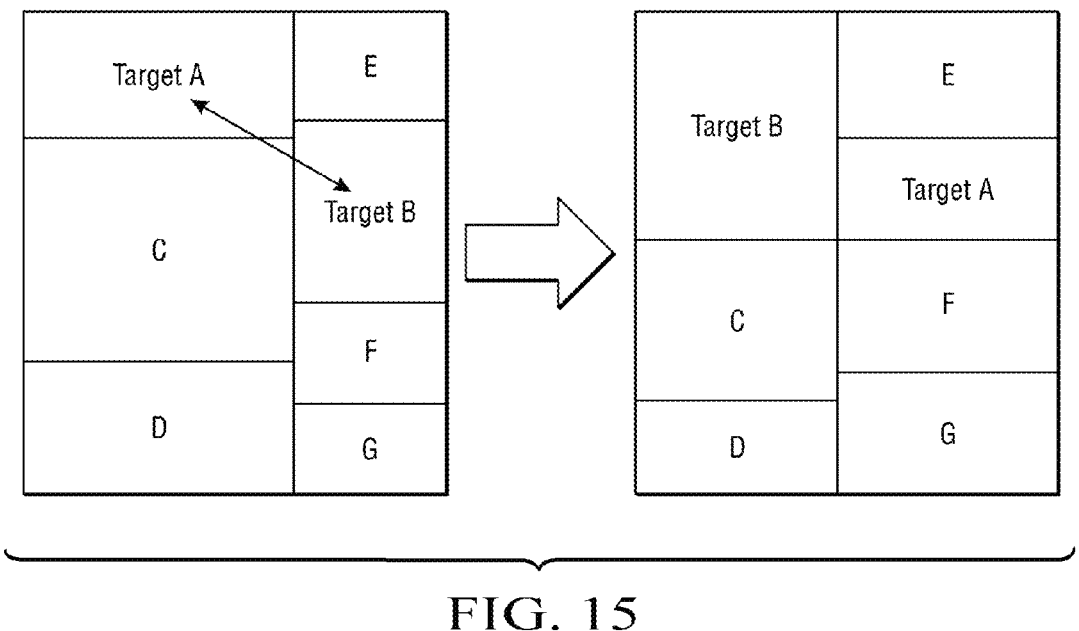
FIG. 15 shows an example of swapping two images with different aspect ratios.

The process of swapping two images is fairly straightforward. Their respective leaf nodes are removed from their original parents and added to the original parent of the other node. If the two images have the same aspect ratio, then no other actions are necessary other than to update the positions of the leaf nodes. If the aspect ratios are different, then the tree must re-compute the aspect ratios of each node going up from each of the swapped nodes to the root, and then re-render the image tree to update all of the node positions. FIG. 15 shows an example of swapping two images with different aspect ratios.

Image Moving

Figure 16:
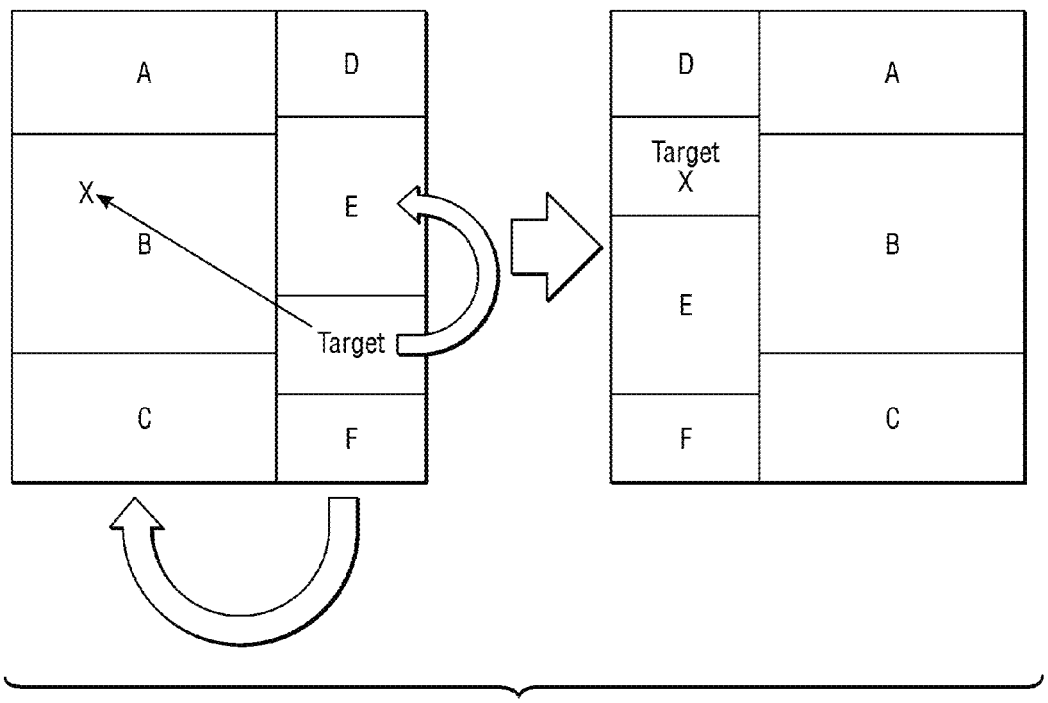
FIG. 16 shows an example of switching the positions of nodes at multiple levels to move an image near a desired location, which is indicated by the letter 'X'.

Every branch node in an image tree has one or more children. These children will be displayed left-to-right or top-to-bottom depending on whether the leaf node has a horizontal layout or vertical layout. The order in which the one or more children is displayed is arbitrary and has no effect on the size or position of the parent node. An image can be moved near to a particular location by moving its position among sibling nodes, updating the position of the parent with respect to its sibling nodes, then the grandparent with respect to its siblings, etc. The overall size and aspect ratio of the image tree will be unchanged, but through moving the order of nodes at each level, the target image can be moved so that it is nearer to a particular location. FIG. 16 shows an example of switching the positions of nodes at multiple levels to move an image near a desired location, which is indicated by the letter 'X'.

Image Deletion

Figure 17:
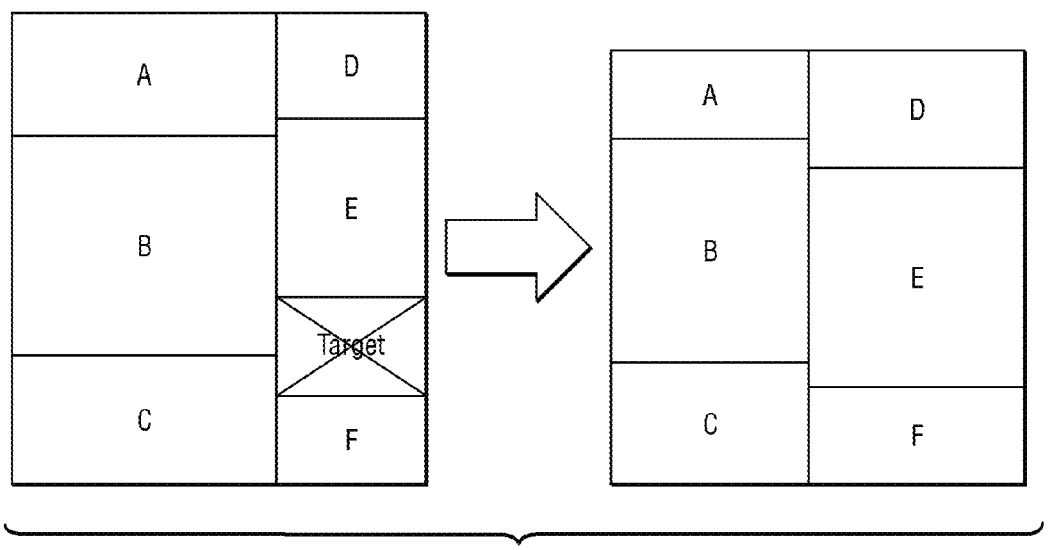
FIG. 17 shows an example of correcting an image tree after deleting a leaf node.

The process of deleting an image is also straightforward. It is sufficient to just remove an image from the layout tree. After removing the image, the tree can be consolidated by removing any branch nodes that only have one child (starting with the deleted node's parent) and moving that child to the branch's original parent. FIG. 17 shows an example of correcting an image tree after deleting a leaf node.

Image Rotation/Replacement

The user may wish to rotate an image by 90-degree increments in the collage layout. This will change the aspect ratio of a single image, but will not affect the tree structure of the collage. Rotation is really just a special case of changing an image's aspect ratio, which can also occur if the user wishes to replace one image with another. For rotation/replacement, the aspect ratio of the target image is adjusted, and then the rest of the collage is updated using the process described earlier for converting an image tree to an image arrangement. If there was a rotation by 90 or 270 degrees, then the location of the image in the final layout will have an inverse aspect ratio. When displaying the image, it can then be rotated and shown in the location with the inverse aspect ratio. If an image is rotated 180 degrees, or flipped horizontally or vertically, then no changes need to happen to the rendering process because the location is the same aspect ratio; the adjusted image can simply be displayed in its original slot with the rotation or flip transformation.

Image Re-Centering

In some scenarios, the user may wish to make fine-grained adjustments to the location of an image so that it is in an exact position with respect to the position of the canvas or shape mask. For example, the user may wish for an image to be exactly in the center of the shape mask. In these cases, an image swap or image move operation may bring the image close to the desired location, but not precisely at the desired location.

To provide for small position adjustments, there is a re-centering placement operation. Re-centering involves two steps. The first is offsetting the entire collage area by a given amount. This will move the position of every image by the same offset. After this movement has occurred, there may be areas of the collage that are empty, and there may be images that extend beyond the bounding box of the collage shape. For images that extend beyond the bounding box, the parts of those images that are outside of the bounding box may be cropped to avoid an unpleasant display.

For empty areas, additional new images may be added to fill on those areas. One way of doing this is to add new images in rectangular strips to the edges of the collage to extend its width or height in the direction of the empty areas. These images may be chosen using any method, and may be added in any manner. Another potentially desirable way of filling in the empty spaces is to replicate the portions of the collage that have been moved outside of the shape bounding box with a continuous "wrapping" effect such that parts of images that are moved outside on one side of the collage are placed into the empty area created on the opposite side of the collage.

The shape collages created by at least one embodiment of the present invention are visually appealing, whether viewed in digital form on a display of a computer system, printed on paper, knit into fabric, or displayed on other objects. Images can be printed on almost any type of object and a shape collage image can be transferred onto any type of object.

Hardware Overview

Figure 18:
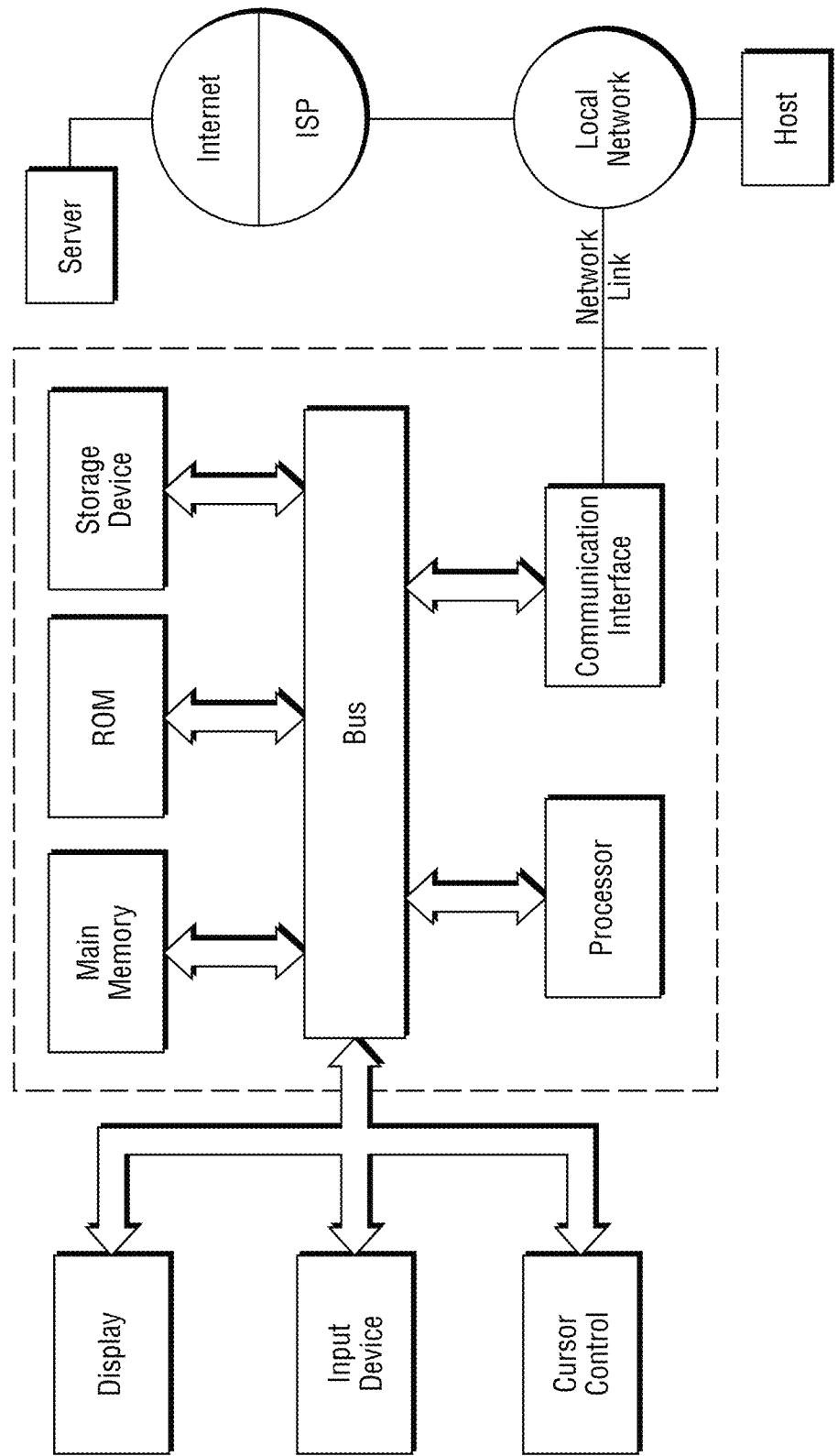
FIG. 18 is a block diagram of a computer system upon which at least one example embodiment of the present invention can be implemented.

FIG. 18 is a block diagram that illustrates a computer system upon which an embodiment of the invention may be implemented. The computer system includes a bus or other communication mechanism for communicating information, and a processor coupled with bus for processing information. The computer system also includes a main memory, such as a random access memory (RAM) or other dynamic storage device, coupled to bus for storing information and instructions to be executed by processor. Main memory also may be used for storing temporary variables or other intermediate information during execution of instructions to be executed by processor. The computer system further includes a read only memory (ROM) or other static storage device coupled to bus for storing static information and instructions for processor. A storage device, such as a magnetic disk or optical disk, is provided and coupled to bus for storing information and instructions.

The computer system may be coupled via bus to a display, such as a cathode ray tube (CRT), for displaying information to a computer user. An input device, including alphanumeric and other keys, is coupled to the bus for communicating information and command selections to processor. Another type of user input device is cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

At least one embodiment of the invention is related to the use of a computer system for implementing the techniques described herein. According to one embodiment of the invention, those techniques are performed by the computer system in response to a processor executing one or more sequences of one or more instructions contained in main memory. Such instructions may be read into main memory from another computer-readable medium, such as a storage device. Execution of the sequences of instructions contained in main memory causes the processor to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operate in a specific fashion. In an embodiment implemented using the computer system, various computer-readable media are involved, for example, in providing instructions to the processor for execution. Such a medium may take many forms, including but not limited to storage media and transmission media. Storage media includes both non-volatile media and volatile media. Non-volatile media includes, for example, optical or magnetic disks. Volatile media includes dynamic memory, such as main memory. Transmission media includes coaxial cables, copper wire and fiber optics, including the wires that comprise a bus. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on the bus. The bus carries the data to main memory, from which processor retrieves and executes the instructions. The instructions received by main memory may optionally be stored on the storage device either before or after execution by the processor.

The computer system also typically includes a communication interface coupled to bus. The communication interface provides a two-way data communication coupling to a network link that is connected to a local network. For example, communication interface may be an integrated services digital network (ISDN) card or a modem to provide a data communication connection to a corresponding type of telephone line. As another example, communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

A network link typically provides data communication through one or more networks to other data devices. For example, the network link may provide a connection through local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

Computer system can send messages and receive data, including program code, through the network(s), the network link and the communication interface. In the Internet example, a server might transmit a requested code for an application program through the Internet, ISP, local network and communication interface.

The received code may be executed by processor as it is received, and/or stored in storage device, or other non-volatile storage for later execution. In this manner, the computer system may obtain application code in the form of a carrier wave.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method of creating a shape collage, the method comprising:
    receiving a shape specification signal which specifies at least one desired shape, each desired shape having at least one shape boundary and a shape area;
    receiving image data which represents a plurality of images; and
    processing the signal and the data to obtain a shape collage of the images which at least partially covers and conforms to the area of the at least one desired shape so that the collage resembles the at least one desired shape, wherein the step of processing includes the steps of:
        creating a tree structure of the images wherein images are represented by tree nodes, the tree nodes corresponding to sub-areas in or near the shape area;
        processing the tree structure to determine locations for the images based on their position in the tree structure;
        evaluating by utilizing at least one coverage predicate whether each image is to be treated as being either within or outside the shape area based on its determined location, removing or hiding at least one image that is evaluated as being outside the shape area and leaving a placeholder node at the location of the at least one removed or hidden image to preserve the tree structure; and
        inserting the at least one removed or hidden image back into a portion of the area evaluated as being within the area by finding a tree node in the tree structure that is within the shape area and inserting the at least one removed or hidden image into an adjacent position in the tree structure.

2. The method as claimed in claim 1, further comprising calculating the at least one coverage predicate and comparing each calculated coverage predicate with a threshold.

3. The method as claimed in claim 1, wherein the at least one desired shape is non-rectangular.

4. The method as claimed in claim 1, wherein the images in the shape collage are non-overlapping.

5. The method as claimed in claim 1, wherein borders between adjacent images in the shape collage are substantially the same.

6. The method as claimed in claim 1, wherein the area of the at least one desired shape is fully covered with the images.

7. The method as claimed in claim 1, wherein the step of processing includes the step of cropping any images that are positioned outside the at least one desired shape to achieve a more visually defined outline of the at least one desired shape.

8. The method as claimed in claim 1, wherein the images are photographic images.

9. The method as claimed in claim 1, wherein the shape specification signal specifies a plurality of desired shapes.

10. The method as claimed in claim 1, further comprising receiving a command signal to locate a user-specified image essentially or proximately at a desired location in the collage and processing the command signal and the shape collage to create a finished shape collage having the user-specified image essentially or proximately at the desired location to increase visual appeal of the finished shape collage to the user.

11. The method as claimed in claim 1, further comprising receiving a command signal to resize a user-specified image from an initial size in the collage to a desired size and processing the command signal and the collage to create a finished shape collage having the user-specified image with the desired size to increase visual appeal of the finished shape collage to the user.

12. A system for creating a shape collage, the system comprising:
    means for receiving a shape specification signal which specifies at least one desired shape, each desired shape having at least one shape boundary a shape area;
    means for receiving image data which represents a plurality of images; and
    at least one processor for processing the signal and the image data to obtain a shape collage of the images which at least partially covers and conforms to the area of the at least one desired shape so that the collage resembles the at least one desired shape, wherein the at least one processor creates a tree structure of the images wherein images are represented by tree nodes the tree nodes corresponding to sub-areas in or near the shape area; the at least one processor processes the tree structure to determine locations for the images based on their position in the tree structure; the at least one processor evaluates whether each image is to be treated as within or outside the shape area based on its determined location utilizing at least one coverage predicate and either removes or hides at least one image that is evaluated to be outside the shape area and leaves a placeholder node at the location of the at least one removed or hidden image to preserve the tree structure; and
    the at least one processor inserts the at least one removed or hidden image into a portion of the area evaluated as being within the area by finding a tree node in the tree structure that is within the shape area and inserting the at least one removed or hidden image into an adjacent position in the tree structure.

13. The system as claimed in claim 12, wherein the at least one processor calculates the at least one coverage predicate and compares each calculated coverage predicate with a threshold.

14. The system as claimed in claim 12, further comprising means for receiving a command signal to locate a user-specified image to essentially or proximately at a desired location in the shape collage, the at least one processor processing the command signal and the shape collage to create a finished shape collage having the user-specified image essentially or proximately at the desired location to increase visual appeal of the finished shape collage to the user.

15. The system as claimed in claim 12, further comprising means for receiving a command signal to resize a user-specified image from an initial size in the collage to a desired size, the at least one processor processing the command signal and the shape collage to create a finished shaped collage having the user-specified image with the desired size to increase visual appeal of the finished shape collage to the user.

16. A computer-readable, non-transitory storage medium that stores a set of instructions including instructions which, when executed by one or more processors, cause the one or more processors to perform steps comprising:
    receiving a shape specification signal which specifies at least one desired shape, each desired shape having at least one shape boundary a shape area;
    receiving image data which represents a plurality of images; and
    processing the shape specification signal and the image data to obtain a shape collage of the images which at least partially cover and conform to the area of the at least one desired shape so that the collage resembles the at least one desired shape, wherein the step of processing includes the steps of:

creating a tree structure of the images wherein images are represented by tree nodes, the tree nodes corresponding to sub-areas in or near the shape area;

processing the tree structure to determine locations for the images based on their position in the tree structure;

evaluating utilizing at least one coverage predicate whether each image is to be treated as within or outside the shape area based on its determined location, removing or hiding at least one image that is evaluated to be outside the shape area and leaving a placeholder node at the location of the at least one removed or hidden image to preserve the tree structure; and inserting at least one removed or hidden image back into a portion of the area evaluated as being within the area by finding a tree node in the tree structure that is within the shape area and inserting the at least one removed or hidden image into an adjacent position in the tree structure.

17. The medium as claimed in claim 16, wherein the steps further comprise calculating the at least one coverage predicate and comparing each calculated coverage predicate with a threshold.

18. The medium as claimed in claim 16, wherein the steps further comprise receiving a command signal to locate a user-specified image essentially or proximately at a desired location in the shape collage and processing the command signal and the shape collage to create a finished shape collage having the user-specified image essentially or proximately at the desired location to increase visual appeal of the finished shape collage to the user.

19. The medium as claimed in claim 16, wherein the steps further comprise receiving a command signal to resize a user-specified image from an initial size in the collage to a desired size and processing the command signal and the collage to create a finished shape collage having the user-specified image with the desired size to increase visual appeal of the finished shape collage to the user.

\* \* \* \* \*

UNITED STATES PATENT AND TRADEMARK OFFICE
CERTIFICATE OF CORRECTION

PATENT NO. : 9,275,479 B2
APPLICATION NO. : 13/768016
DATED : March 1, 2016
INVENTOR(S) : Kevin R. Borders et al.

Page 1 of 1

It is certified that error appears in the above-identified patent and that said Letters Patent is hereby corrected as shown below:

Claims

Column 22, Line 8, Claim 12:

After "having at least one shape boundary"
Insert -- and --.

Column 22, Line 62, Claim 16:

After "having at least one shape boundary"
Insert -- and --.

Column 23, Line 9, Claim 16:

After "evaluating"
Insert -- by --.

Signed and Sealed this
Seventeenth Day of May, 2016

Michelle K. Lee
*Director of the United States Patent and Trademark Office*